US009924829B2

(12) United States Patent
Stutz

(10) Patent No.: US 9,924,829 B2
(45) Date of Patent: Mar. 27, 2018

(54) DEVICE FOR PREPARING MILK FROTH THAT CAN BE OPTIONALLY HOT OR COLD, OR FOR DISPENSING OPTIONALLY HOT OR COLD MILK

(71) Applicant: Eugster/Frismag AG, Amriswil (CH)

(72) Inventor: Dieter Stutz, Bussnang (CH)

(73) Assignee: EUGSTER/FRISMAG AG, Amriswil (CH)

( * ) Notice: Subject to any disclaimer, the term of this patent is extended or adjusted under 35 U.S.C. 154(b) by 363 days.

(21) Appl. No.: 14/430,084

(22) PCT Filed: Sep. 23, 2013

(86) PCT No.: PCT/EP2013/002856
§ 371 (c)(1),
(2) Date: Mar. 20, 2015

(87) PCT Pub. No.: WO2014/044407
PCT Pub. Date: Mar. 27, 2014

(65) Prior Publication Data
US 2015/0223633 A1 Aug. 13, 2015

(30) Foreign Application Priority Data
Sep. 21, 2012 (DE) .................... 20 2012 009 074 U

(51) Int. Cl.
*A47J 31/44* (2006.01)
*A01J 11/04* (2006.01)
(Continued)

(52) U.S. Cl.
CPC ........... *A47J 31/4489* (2013.01); *A01J 11/04* (2013.01); *B01F 3/04808* (2013.01); *B01F 15/026* (2013.01); *B01F 2215/0006* (2013.01)

(58) Field of Classification Search
USPC .................................. 99/281, 275, 293, 294
See application file for complete search history.

(56) References Cited

U.S. PATENT DOCUMENTS 5,551,331 A * 9/1996 Pfeifer .................... A47J 31/56
99/280
5,975,365 A * 11/1999 Hsieh .................... G07F 13/065
222/129.3
(Continued)

FOREIGN PATENT DOCUMENTS

DE 39 02 281 C1 6/1990
DE 603 12 165 T2 11/2007
(Continued)

OTHER PUBLICATIONS

English translation of WO 2011140667.*

*Primary Examiner* — Anne M Antonucci
*Assistant Examiner* — Renee LaRose
(74) *Attorney, Agent, or Firm* — Norton Rose Fulbright US LLP

(57) ABSTRACT

The invention relates to a device for preparing milk froth that can be optionally hot or cold, or for dispensing optionally hot or cold milk (1), said device comprising a milk container (4) that can be removed from the device, a milk inlet which connects the milk container (4) to a cold froth device via a milk valve section, said cold froth device being activatable by means of an air valve section, and comprising an outlet line (15) that is located downstream of the cold froth device and comprises an outlet (16). The milk container (4) can be inserted into the device (1) in a guided manner and the base (4a) of said container is equipped with a milk snap-in valve (17). A complementary receiving section (17a) for the milk snap-in valve is fixed in the device (1) and is formed as a milk inlet directly on the milk valve section. When the milk container (4) is inserted, the milk snap-in valve (17) engages in the complementary receiving section (17a) for the snap-in valve and is locked therein.

13 Claims, 1 Drawing Sheet

Figure 1:
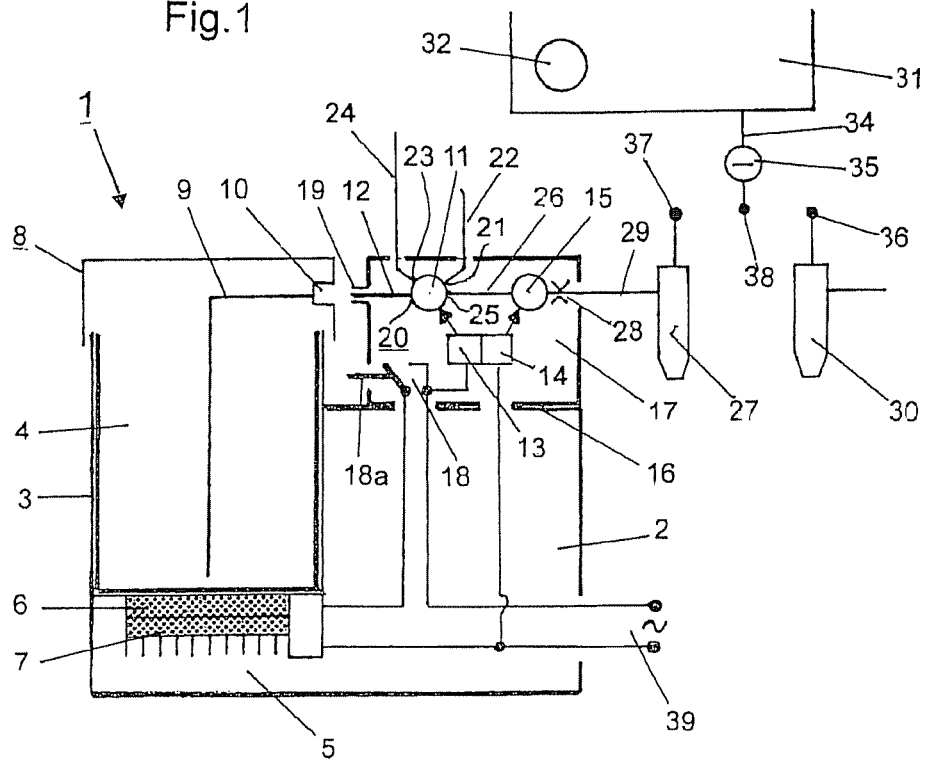

(51) Int. Cl.
 *B01F 3/04* (2006.01)
 *B01F 15/02* (2006.01)

(56) References Cited

U.S. PATENT DOCUMENTS

| | | | |
|---|---|---|---|
| 6,099,878 A | 8/2000 | Arksey | |
| 7,448,314 B2* | 11/2008 | Ioannone | A47J 31/4485 134/22.12 |
| 7,980,170 B2* | 7/2011 | Paloheimo | A23F 5/243 426/433 |
| 8,661,967 B2* | 3/2014 | Gonen | A47J 31/36 99/281 |
| 8,695,482 B2* | 4/2014 | Goeckner | A47J 31/002 426/433 |
| 8,962,053 B2* | 2/2015 | Carbonini | A47J 31/4489 426/443 |
| 2006/0286262 A1* | 12/2006 | Stearns | A47J 31/41 426/596 |
| 2009/0092728 A1* | 4/2009 | Coccia | A47J 31/4485 426/569 |
| 2009/0095163 A1* | 4/2009 | Sala | A47J 31/402 99/284 |
| 2011/0005407 A1* | 1/2011 | Reyhanloo | A47J 31/4485 99/453 |
| 2012/0222666 A1* | 9/2012 | Morgandi | A47J 31/56 126/344 |

FOREIGN PATENT DOCUMENTS

| | | |
|---|---|---|
| DE | 10 2008 021 777 A1 | 11/2009 |
| DE | 10 2009 041 809 A1 | 4/2011 |
| EP | 2 294 952 A1 | 3/2011 |
| EP | 2 298 142 A1 | 3/2011 |
| WO | WO 2005/013781 A1 | 2/2005 |
| WO | WO 2008/083941 A1 | 7/2008 |
| WO | WO 2011/105942 A1 | 9/2011 |
| WO | WO 2011/140667 A1 | 11/2011 |

* cited by examiner

DEVICE FOR PREPARING MILK FROTH THAT CAN BE OPTIONALLY HOT OR COLD, OR FOR DISPENSING OPTIONALLY HOT OR COLD MILK

The invention relates to a device for the preparation of optionally cold or warm milk froth or the dispensing of optionally cold or warm milk according to the preamble of claim 1.

According to the prior art, coffee preparation devices, particularly espresso machines, are frequently equipped with milk froth preparation devices which comprise, as an essential component, a frothing device with a flow path embodied as a venturi nozzle. The flow path is connected to a milk conduit into which an air intake line or opening can lead for the preparation of milk froth. To prepare milk froth, steam is fed to the flow path of the frothing device embodied as a venturi nozzle from a steam generator of the coffee preparation device, by whose flow in the flow path low pressure is generated which suctions milk from a milk container via the milk conduit and air via the air duct. As a consequence, steam, milk and air are mixed in the flow path and frothed into warm milk froth. If the air supply is blocked, no froth is produced in the flow path of the frothing device, and only hot milk is prepared.

Recently, there is demand for devices for the preparation of milk froth which offer the possibility of not only producing warm milk froth but also dispensing cold milk froth. For this purpose, cold milk is pumped by means of a delivery pump from a reservoir to a frothing unit, and the air bringing about the frothing is either suctioned via an air supply line leading to a milk conduit, in which low pressure is formed as a result of the rate of flow of the milk, or the air is fed via an air conduit to the milk by means of high pressure generated by a pump. Mixture of the milk with the air can occur right in the milk conduit or later in a milk frothing device.

Moreover, it is known to optionally produce warm froth or cold froth in the same milk froth preparation device. To produce warm milk froth or even only warm milk, the milk conveyed by the pump or the milk/air mixture fed to the frothing device can be fed through a heat exchanger before or in the frothing device.

With such a known device for producing milk froth or milk beverages, in which milk is suctioned on demand from a container by means of a pump and conveyed to an outlet, and in which it is possible to mix air with the milk and process the resulting milk/air mixture in a cold or hot state into milk froth through a restriction, a provision is made to optionally convey the milk/air mixture directly or via a flow heater of the device to the outlet (WO 2008/083941 A1). Specifically, an outlet line arranged downstream from the pump has two parallel sections arranged between the restriction and the outlet and can optionally be activated via a valve, with the flow heater being associated with only one of these parallel sections. In this way, cold or hot milk froth can be conveyed to the outlet. This device for generating milk froth or milk beverages can be embodied as an independent device or as a component of a coffee maker.

It is the object of the present invention to provide a compact, efficient device for optionally preparing cold or warm milk froth or dispensing cold or warm milk which is characterized by reduced effort.

This object is achieved with a device of the type mentioned at the outset with the features indicated in claim 1.

Accordingly, the invention is based on a device for the preparation of optionally cold or warm milk froth or the dispensing of optionally cold or warm milk which comprises a milk container, a milk inlet that connects the milk container via a milk valve channel to a cold-frothing device that can be activated via an air valve channel, an outlet line arranged downstream from the frothing device with an outlet, and means for heating the milk froth prepared in the frothing device or the milk flowing through the cold-frothing device. In particular, the cold-frothing device can have a restrictor section or restrictor through which the milk flows that is aerated in order to produce froth. The generation of froth can already begin downstream from the connection of the milk valve channel to the air valve channel. A pump, particularly a suction pump, can be provided for transporting the milk through the milk inlet, the milk valve channel and the cold-frothing device.

As a means for the optional heating of the milk froth prepared in the cold-frothing device or of the milk flowing through it, the outlet on the outlet line of the device comprises a steam-heating device with a steam generator coupling device embodied such that the outlet is capable in conjunction therewith of heating milk froth or milk when steam from an external steam generator or a steam outlet line of the steam generator is fed into the steam generator coupling device.

The device can prepare cold milk froth or dispense cold milk without connecting the steam generator coupling device to an external steam generator. For this purpose, the device can be used as an independently usable simple assembly. To operate the device as an independent device in the uncoupled state in which cold milk froth or cold milk can be dispensed from it, the steam generator coupling device can be locked, and it can particularly be locked automatically in an especially advantageous manner according to claim 9, when the steam generator coupling device is separated from an external steam generator or its steam line.

If the possibility of the optional preparation of warm milk froth or warm milk is desired, the steam generator coupling device is connected to an external steam generator or a steam outlet line in order to optionally activate the steam-heating device of the outlet by feeding in steam and thus heating the milk froth or the milk, which is then dispensed from the outlet. Since the heating of the milk froth or milk only takes place in the outlet, there are no heat losses in the outlet line. Consequently, no steam generator is provided in the device for the preparation of warm milk froth or warm milk; rather, in much less elaborate fashion, only the steam generator coupling device of the outlet of the device for coupling to the external steam generator or its steam outlet line is present which has a complementary steam generator coupling device.

In other words, the means for the preparation of warm milk froth or warm milk is complete if the steam generator coupling device is coupled directly or indirectly to an external steam generator outside of the independently usable device. To carry out the heating function, the steam generator coupling device is no longer blocked, but open.

According to claim 10, the outlet or its steam-heating device can be embodied in uncomplicated fashion as a mixer in which the cold milk froth that is fed in is mixed with the steam fed in by the steam generator coupling device, thus heating the mixture directly.

However, if the cold-prepared milk froth or the cold milk is not to come into direct contact with the heating steam in order to remain as unchanged as possible in its material composition during heating, instead of the embodiment as a mixer it is also possible according to claim 11 to embody the steam-heating device of the outlet as a heat exchanger heated by the externally generated steam through which the cold-prepared milk froth or the cold milk flows.

Especially advantageously, the separate device for the preparation of optionally cold or warm milk froth or the dispensing of optionally cold or warm milk is used according to claim 12 in conjunction with a beverage preparation device, particularly a coffee beverage preparation device, with it being possible to connect the steam generator coupling device of the outlet of the device for the preparation of optionally cold or warm milk froth or the dispensing of optionally cold or warm milk to a steam outlet line of the steam generator of the beverage preparation device provided with a steam valve. When the steam generator coupling device is connected, the steam generator present in the beverage preparation device can also be used to produce warm milk froth or warm milk if the steam generator is switched on and the steam valve of the steam outlet line coupled with the device is opened in a controlled manner.

By feeding the steam produced using an external powerful steam generator through the steam generator coupling device into the steam-heating device of the outlet of the device for the preparation of optionally cold or warm milk froth or optionally cold or warm milk, the outlet can also sufficiently heat the milk froth generated from cold milk or the cold milk that was previously cooled.

In order to produce milk froth from cooled milk or to dispense cooled milk, the device comprises a Peltier element and a milk container holding chamber, with the milk container holding chamber and/or the milk container that is inserted into the milk container holding chamber being connected in a thermally conductive manner to the cold side of the Peltier element. For this purpose, the cold side of the Peltier element can be arranged on a wall of the milk container holding chamber or, in order to achieve uniform cooling, it can expediently be arranged according to claim 3 with a flat cold side under the bottom thereof.

In order to minimize undesired heating of the milk already in the milk container holding chamber or in a milk container received by the milk container holding chamber, and for hygienic reasons, the milk container holding chamber or the milk container according to claim 4 has a removable lid with a milk suction line protruding into the milk container or into the milk container holding chamber that is provided with a coupling device of the milk suction line. To further process the cold or cooled milk, a milk line in the device that leads to the milk valve channel is provided with a complementary coupling device that can be coupled with the coupling device of the milk suction line. Together with the coupling device and the complementary coupling device, the milk suction line forms the milk inlet to the milk line.

A compact embodiment of this device for the preparation of optionally cold or warm milk froth or the dispensing of optionally cold or warm milk has a housing unit with the milk container holding chamber and the Peltier element as well as functional unit which comprises the cold-frothing device, the milk valve channel and the air valve channel, with the functional unit being displaceable in the housing in a substantially horizontal manner with respect to the milk container holding chamber or the milk container and the lid such that the complementary coupling device of the milk line can reliably be connected to the coupling device of the milk suction line. In particular, the functional unit can be displaced manually in a dependable manner. In the initial position of the functional unit removed from the milk container holding chamber or the milk container and the lid, the lid can easily be taken off and the milk container removed from the milk container holding chamber.

In order to precisely guide the displaceable functional unit and connect it to the coupling device of the milk suction line, the functional unit is preferably guided according to claim 2 in a carriage guide of the housing unit.

In an especially compact construction, a manifold valve, a pump and electrical drive members of the manifold valve and pump are arranged according to claim 5 in the functional unit. Besides a manifold valve outlet the manifold valve comprises the milk valve channel, the air valve channel and a rinsing fluid valve channel through which a rinsing agent line can be added to the manifold valve outlet. The manifold valve is particularly embodied such that, in a first position, it connects the manifold valve outlet to the milk inlet or, in a second position, it connects the manifold valve outlet to the milk inlet and the air inlet on an air feed, whereby air is added to the milk by means of the low pressure occurring as a result of the flowing milk or under the effect of the pump in order to produce froth. In a third position of the manifold valve, its manifold valve outlet is connected to a rinsing agent line, whereby rinsing agent or rinsing fluid is fed to the pump, the cold-frothing device, the outlet line and the outlet, since the pump and the cold-frothing device in the functional unit are arranged in terms of their flow between the manifold valve outlet and the outlet line.

Moreover, according to claim 6, internal control units of the electrical drive members of the manifold valve and pump are expediently arranged in the functional unit.

To supply the functional unit and the Peltier element of the device with power with which the power supply can reliably be activated, a power supply connection as well as a start contact of the power supply that can be displaced through the functional unit, particularly actuated by means of a push rod, are arranged according to claim 7 in the housing unit. The drive members can be controlled manually via a switching device without an external control.

In a modification of the internal control units, it is also possible, according to claim 8, for them to have an interface to the wireless or wired connection to a central control unit in order to control the drive members of the manifold valve and pump in a centralized manner, particularly with a control unit of the beverage preparation device according to claim 13. The central control unit expediently also controls a controllable steam valve in the steam outlet line of the steam generator of the beverage preparation device or the steam generator itself, with it being possible to connect the steam outlet line to the steam generator coupling device of the device for the preparation of optionally cold or warm milk froth or optionally cold or warm milk.

When the steam generator coupling device is connected and the steam valve is open, the steam generator to which the steam outlet line is connected is efficiently used in the beverage preparation device for the preparation of warm milk froth or warm milk.

The connection of the steam generator coupling device to the steam outlet line of the beverage preparation device can also be performed indirectly via a conventional frothing device of the beverage preparation device.

An exemplary embodiment of the invention is explained below on the basis of a schematic drawing with two figures, from which the features of the invention can be seen.

Figure 2:
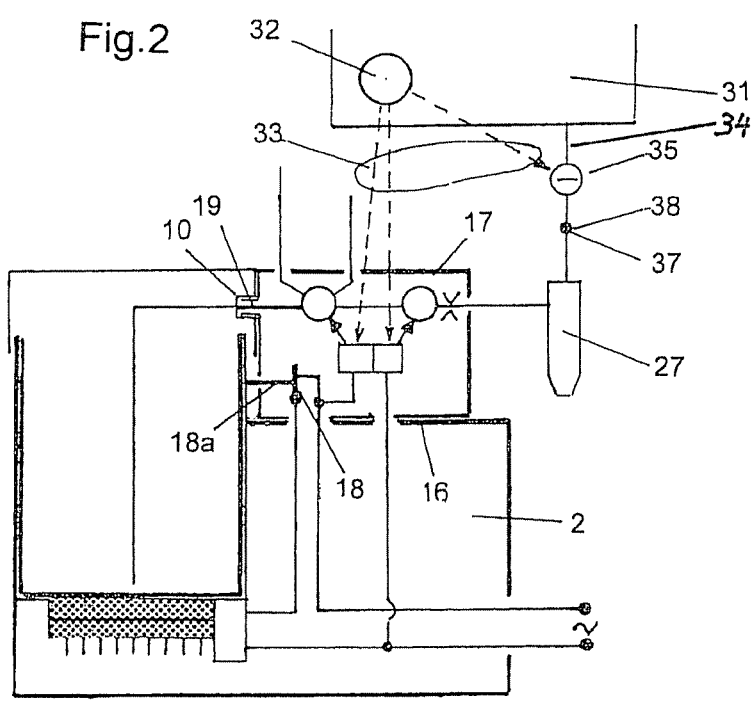

FIG. 1 shows a device for preparing optionally cold or warm milk froth or for dispensing optionally cold or warm milk in a state in which it is separated from a beverage preparation device in terms of flow and control before the operating state, and FIG. 2 the device according to FIG. 1, but in a state in which it is connected to the beverage preparation device in terms of flow and control and in the operating state.

In FIG. 1, the device for the preparation of optionally cold or warm milk froth or the dispensing of optionally cold or warm milk is generally designated by 1. It comprises a housing unit 2 with a milk container holding chamber 3 into which a milk container 4 is inserted, with a removable lid 8 from which a milk suction line 9 reaches down into the bottom area of the milk container holding chamber 3 or into a milk container 4 in the milk container holding chamber 3. On one side of the lid 8, the milk suction line 9 is provided with a coupling device 10 that is accessible from the outside.

The device further comprises a functional unit 17 that can be displaced horizontally in a carriage guide 16 of the housing unit 2. The functional unit is arranged in the housing unit 2 next to the milk container holding chamber and can be displaced such that it can be separated or detached from the milk container holding chamber 3, as shown in FIG. 1, or pushed laterally up onto the milk container holding chamber 3, as shown in FIG. 2.

The functional unit comprises a manifold valve 1, a pump 15, electrical drive members (not shown) of the manifold valve 11 and pump 15, as well as internal control units 13 and 14 of the manifold valve 11 and pump 15 with which they can be set and switched on. On the side facing toward the milk container holding chamber 3, the functional unit 17 has a complementary coupling device 19 that is capable—in a state in which it is connected to the coupling device 10, see FIG. 2—of connecting the milk suction line 9 in the milk container 4 or in the milk container holding chamber 3 to a milk line 12 in the functional unit. Milk can be introduced from the milk container 4 or the milk container holding chamber 3 sealed with the lid 8 via the coupling device 10 arranged on a lateral end of the milk suction line 9 and the complementary coupling device 19 coupled therewith into the milk line 12 of the functional unit and via the milk line 12 into a milk inlet of the manifold valve 11, when the functional unit 17 is pushed against the milk container holding chamber 3.

Particularly for the preparation of cold milk or cold milk froth with the device, a bottom (not shown) of the milk container holding chamber 3 is connected in a thermally conductive manner to the cold side of a Peltier element 5. With the Peltier element 5, milk that is precooled in a refrigerator can be additionally cooled in the milk container that can be placed in the receiving chamber.

To supply the Peltier element 5 with power, the housing unit 2 has a power supply connection 39 that also supplies internal control units 13, 14 for drive members of the manifold valve 11 and pump 15 with power. The Peltier element 5 is only supplied with power when the functional unit 17 is in a state in which it is pushed against the milk container holding chamber 3, whereby the start contact 18 is closed by means of a push rod 18a; see FIG. 2.

In the displaceable functional unit 17, besides the manifold valve 11, which is a three-way valve, and the milk line 12 between the complementary coupling device 19 and the milk inlet 20 of the three-way valve, there are arranged an air conduit 22, a rinsing agent line 24 and a manifold valve outlet line 26 that leads to an inlet of the pump 15 embodied as a suction pump whose outlet is connected via a restrictor 28 to the outlet line 29. The restrictor 28 has a function of preparing cold milk froth, when aerated milk is fed to it from the manifold valve 11 via the pump 15. An outlet line 29 is connected to an outlet of the restrictor 28 that leads to an outlet 27 outside of the functional unit 17.

The outlet 27 has a steam generator coupling device 37 connected to a steam-heating device of the outlet 27 that can be connected to a complementary steam generator coupling device 38, which can be charged with steam from a steam outlet line 34 via a steam valve 35; see FIG. 2.

In the configuration of the device 1 according to FIG. 1, in which no external steam outlet line is connected to the steam generator coupling device 37 and the steam generator coupling device is locked, the outlet 27 serves as a dispensing device for cold milk or cold milk froth.

In contrast, if the steam generator coupling device 37 is connected according to FIG. 2 to the complementary steam generator coupling device 38 and is itself open and connected in a steam-conducting manner via the opened steam valve 35 to the steam outlet line 34, the hot steam generated in the steam generator of the beverage preparation device 31 can heat cold milk froth that was prepared in the functional unit 17 and flows with the steam-heating device into the outlet 27, or it can effectively heat cold milk directly or indirectly. In order to dispense cold milk froth or cold milk from the outlet 27, the steam valve 35 is closed.

The steam valve 35 in the steam outlet line 34 and the control units 13, 14 of the manifold valve 11 and pump 15 are expediently controlled by a central control unit 32 of the beverage preparation device via control connections 33, which can be wired or wireless and are indicated in FIG. 2 by broken lines. For this purpose, the internal control units 13, 14 can have an interface through which they communicate via the control connections 33 with the external control unit 32.

In addition to the milk inlet 20, the manifold valve 11 in the functional unit 17, which can also be controlled by the central control unit 32, has an air inlet 21 with the air conduit 22 and a rinsing agent inlet 23 with the rinsing agent line 24 that leads to a rinsing agent container (not shown).

To start the device, after insertion of the milk container 4 into the milk container holding chamber 3 and closing with the lid 8, the functional unit 17 is pushed in the carriage guide 16 toward the milk container holding chamber 3 against the milk container lid 8 such that the milk line 12 leading to the manifold valve 11 is coupled by means of its complementary coupling device 19 with the coupling device 10 of the milk suction line 9 of the container lid 8 and the start contact 18 is closed by means of the push rod 18a running against the milk container holding chamber 3.

If the manifold valve 11 is then placed by its control unit 13 and its drive member into its first position, the milk inlet 20 is connected to the manifold valve outlet 25, with the air inlet 21 and the rinsing agent inlet 23 being blocked. The milk suctioned by the pump 15 is sucked out of the manifold valve outlet 25 and a milk valve channel of the manifold valve 11 and fed to the outlet 27 as pure milk.

In contrast, if the manifold valve 11 is placed by its control unit 3 controlled by its drive member into a second position, the milk inlet 20 remains connected to the manifold valve outlet 25 and the air inlet 21, which is connected to the milk valve channel, also referred to as a milk flow path, is opened. As a result, in addition to the milk suctioned by the pump 15, air is also suctioned in the manifold valve 11 and added to the milk. The resulting milk/air mixture is further pumped by the pump 15 through the restrictor 28, which is arranged between the manifold valve outlet 25 and the outlet 27 and, in the present exemplary embodiment, is located downstream from the pump 15. The milk/air mixture compressed in the restrictor 28 expands downstream from the restrictor, and milk froth is fed to the outlet 27 through the outlet line 29.

In a third position controlled by the control unit 3 and the drive member of the manifold valve 11, the milk inlet 20 and the air inlet 21 are blocked, while the rinsing agent inlet 24 is open and the rinsing agent line 24 is connected via a rinsing fluid valve channel to the manifold valve outlet 25. In this case, the pump 15 sucks rinsing fluid through the manifold valve 11 and conveys the rinsing fluid through the manifold valve outlet line 26, the pump 15 and the outlet line 29 to the outlet 27.

In a variation of the device 1 for the preparation of milk froth, the valve positions of the manifold valve 11 and the operation of the pump 15 can also be selected manually independently of a beverage preparation device by means of the internal control units 13, 14 for the manifold valve 11 and the pump 15 via a switching arrangement (not shown).

As shown in FIG. 1, the outlet 27 of the device 1 need not be connected to any external steam outlet line 34 or to a steam generator in order to prepare cold froth and dispense cold milk. It can, however, as shown in FIG. 2, also remain connected to the steam outlet line 34 when preparing cold froth or dispensing cold milk, provided that the steam outlet valve 35 is closed by the central control unit 32 and the steam generator is inactive.

On the other hand, in order to prepare warm milk froth or warm milk, the outlet 27 must be functionally connected via its steam generator coupling device 37 to a steam outlet line 34, for example, or to a steam generator, so that steam is fed in the present example from the steam outlet line 34 via the controlled steam outlet valve 35 to the outlet 27.

It is indicated in FIG. 1 that the outlet 27 of the device 1 can be connected with its steam generator coupling device 37 to the complementary steam generator coupling device 38 of the beverage preparation device 31 in place of a conventional frother 30 having a steam generator coupling device 36 and a frother milk line only dispensing hot milk.

LIST OF REFERENCE SYMBOLS 1 device for the preparation of milk froth
2 housing unit
3 milk container holding chamber
4 milk container
5 Peltier element
6 Peltier element cold side
7 Peltier element warm side
8 lid
9 milk suction line
10 coupling device
11 manifold valve
12 milk line
13 control unit manifold valve
14 control unit pump
15 pump
16 carriage guide
17 functional unit
18 start contact
18a push rod
19 complementary coupling device
20 milk inlet
21 air inlet
22 air conduit
23 rinsing agent inlet
24 rinsing agent line
25 manifold valve outlet
26 manifold valve outlet line
27 outlet
28 restrictor
29 outlet line
30 frother
31 beverage preparation device
32 central control unit
33 control connections
34 steam outlet line
35 steam valve
36 steam generator coupling device
37 steam generator coupling device
38 complementary steam generator coupling device
39 power supply connection

The invention claimed is:

1. A device for preparing optionally cold or warm milk froth or for dispensing optionally cold or warm milk, comprising:
a milk container,
a milk inlet which connects the milk container via a milk valve channel to a cold-frothing device that can be activated via an air valve channel,
an outlet line arranged downstream from the cold-frothing device, with an outlet, wherein
the outlet comprises a steam-heating device with a lockable steam generator coupling device with which the outlet is capable of heating cold milk froth prepared in the cold-frothing device or milk,
the device comprises a Peltier element and a milk container holding chamber,
the milk container holding chamber and/or the milk container is connected to a cold side of the Peltier element in a thermally conductive manner,
the device comprises a housing unit with the milk container holding chamber and the Peltier element, and a unit having the milk valve channel, the air valve channel and the cold-frothing device,
the unit can be displaced substantially horizontally in the housing unit such that a complementary coupling device of a milk line can be connected to a coupling device of a milk suction line,
a manifold valve is arranged in the unit which comprises a manifold valve outlet, the milk valve channel, the air valve channel and a rinsing fluid valve channel through which a rinsing agent line can be added to the manifold valve outlet,
a pump and the cold-frothing device are arranged in terms of flow in the unit between the manifold valve outlet and the outlet line, and
electrical drive members of the manifold valve and the pump are arranged in the unit.

2. The device as set forth in claim 1, wherein the unit is guided in a carriage guide of the housing unit.

3. The device as set forth in claim 1, wherein the Peltier element is arranged under a bottom of the milk container holding chamber.

4. The device as set forth in claim 1, wherein
the milk container holding chamber or the milk container has a removable lid with the milk suction line protruding into the milk container or into the milk container holding chamber and with the coupling device of the milk suction line, and
the milk line that leads to the milk valve channel is provided with the complementary coupling device that can be connected to the coupling device of the milk suction line, with the milk suction line along with the coupling device and the complementary coupling device forming the milk inlet to the milk line.

5. The device as set forth in claim 1, wherein internal control units of the electrical drive members of the manifold valve and the pump are arranged in the unit.

6. The device as set forth in claim 5, wherein
a power supply connection and a start contact that can be actuated by the unit are arranged in the housing unit, and
a power supply of the unit and of the Peltier element can be activated by the start contact.

7. The device as set forth in claim 6, wherein the internal control units have an interface via a wireless or wired connection to a central control unit.

8. The device as set forth in claim 1, wherein the steam generator coupling device is automatically lockable in an uncoupled state.

9. The device as set forth in claim 1, wherein the outlet has a mixing device for mixing the milk froth or the milk with steam prepared in the cold-frothing device as the steam-heating device.

10. The device as set forth in claim 1, wherein the outlet has a steam-heated heat exchanger as the steam-heating device.

11. A beverage preparation device, particularly a coffee beverage preparation device, with a steam generator and with the device for the preparation of optionally cold or warm milk froth or optionally cold or warm milk as set forth in claim 1,
wherein the steam generator coupling device of the device can be coupled with a steam outlet line of the steam generator provided with a controllable steam valve.

12. The beverage preparation device as set forth in claim 11, wherein
a central control unit is a component of the beverage preparation device, and
an actuating member of the steam valve is connected to the central control unit.

13. The device as set forth in claim 1, further comprising an optionally activatable steam generator for heating the milk froth prepared in the cold-frothing device or the milk flowing through the cold-frothing device.

* * * * *